(12) United States Patent
Cheng et al.

(10) Patent No.: US 11,682,766 B2
(45) Date of Patent: Jun. 20, 2023

(54) SILICONE BALL CONTAINING ELECTRODE AND LITHIUM ION BATTERY INCLUDING THE SAME

(71) Applicant: NEC CORPORATION, Tokyo (JP)

(72) Inventors: Qian Cheng, Tokyo (JP); Noriyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 16/477,426

(22) PCT Filed: Jan. 27, 2017

(86) PCT No.: PCT/JP2017/002895
§ 371 (c)(1),
(2) Date: Jul. 11, 2019

(87) PCT Pub. No.: WO2018/138865
PCT Pub. Date: Aug. 2, 2018

(65) Prior Publication Data
US 2019/0379047 A1    Dec. 12, 2019

(51) Int. Cl.
*H01M 4/62*    (2006.01)
*H01M 4/66*    (2006.01)
(Continued)

(52) U.S. Cl.
CPC ............. *H01M 4/62* (2013.01); *H01M 4/587* (2013.01); *H01M 4/661* (2013.01);
(Continued)

(58) Field of Classification Search
CPC ........ H01M 4/62; H01M 4/587; H01M 4/661; H01M 4/133; H01M 4/134; H01M 4/1395;
(Continued)

(56) References Cited

U.S. PATENT DOCUMENTS

2005/0010811 A1 * 1/2005 Zimmer ................ G06F 9/4401
726/4
2007/0224509 A1 * 9/2007 Aramata ............... H01M 4/136
429/231.95
(Continued)

FOREIGN PATENT DOCUMENTS

| JP | 07-045304 A | 2/1995 |
| JP | 11-214011 A | 8/1999 |

(Continued)

OTHER PUBLICATIONS

International Search Report for PCT/JP2017/002895 dated May 9, 2017 [PCT/ISA/210].
(Continued)

*Primary Examiner* — Carlos Barcena
(74) *Attorney, Agent, or Firm* — Sughrue Mion, PLLC

(57) ABSTRACT

The invention provides a lithium ion battery comprising: an anode comprising an anode active material layer on an anode current collector, the anode active material layer having a mass load higher than 60 g/m$^2$; a cathode comprising a cathode active material layer on a cathode current collector, the cathode active material layer having a mass load higher than 80 g/m$^2$; and an electrolytic solution comprising an imide anion based lithium salt and LiPO$_2$F$_2$, wherein at least one of the anode and cathode active material layers comprises a spacer comprising silicone ball.

20 Claims, 3 Drawing Sheets

(51) Int. Cl.
  *H01M 4/587* (2010.01)
  *H01M 10/0525* (2010.01)
  *H01M 10/0568* (2010.01)
  *H01M 10/0569* (2010.01)
  *H01M 4/02* (2006.01)

(52) U.S. Cl.
  CPC ... *H01M 10/0525* (2013.01); *H01M 10/0568* (2013.01); *H01M 10/0569* (2013.01); *H01M 2004/021* (2013.01); *H01M 2004/027* (2013.01); *H01M 2300/004* (2013.01)

(58) Field of Classification Search
  CPC ....... H01M 10/0568; H01M 2004/021; H01M 2004/027; H01M 2300/004; C08K 5/54; C08K 5/5419
  USPC .......................................................... 429/332
  See application file for complete search history.

(56) References Cited

U.S. PATENT DOCUMENTS

| | | | | |
|---|---|---|---|---|
| 2008/0090152 | A1* | 4/2008 | Kosuzu | H01M 4/386 |
| | | | | 429/231.95 |
| 2010/0119956 | A1 | 5/2010 | Tokuda et al. | |
| 2010/0248031 | A1* | 9/2010 | Yamamoto | H01M 4/387 |
| | | | | 429/219 |
| 2011/0318649 | A1* | 12/2011 | Eitouni | H01B 1/122 |
| | | | | 429/313 |
| 2012/0177992 | A1* | 7/2012 | Miyoshi | H01M 4/134 |
| | | | | 429/211 |
| 2013/0209882 | A1* | 8/2013 | Kim | H01M 4/623 |
| | | | | 429/217 |
| 2013/0302675 | A1* | 11/2013 | Kouzu | H01M 4/362 |
| | | | | 429/211 |
| 2013/0344391 | A1* | 12/2013 | Yushin | H01M 4/587 |
| | | | | 429/231.8 |
| 2014/0065464 | A1* | 3/2014 | Masarapu | H01M 10/446 |
| | | | | 429/149 |
| 2014/0170503 | A1* | 6/2014 | Yushin | H01M 10/0525 |
| | | | | 429/306 |
| 2015/0118580 | A1* | 4/2015 | Kondo | H01M 10/0568 |
| | | | | 429/338 |
| 2015/0214548 | A1* | 7/2015 | Ohno | H01M 4/625 |
| | | | | 429/231.8 |
| 2015/0214571 | A1* | 7/2015 | Yamaguchi | H01M 10/052 |
| | | | | 427/80 |
| 2016/0013517 | A1* | 1/2016 | Nakazawa | H01M 4/587 |
| | | | | 429/200 |
| 2016/0111700 | A1* | 4/2016 | Ikenuma | H01M 4/366 |
| | | | | 429/126 |
| 2016/0268636 | A1* | 9/2016 | Cha | H01M 10/0568 |
| 2016/0336593 | A1* | 11/2016 | Honda | H01M 4/525 |
| 2017/0012320 | A1* | 1/2017 | Ogihara | H01M 4/587 |
| 2017/0214091 | A1* | 7/2017 | Abe | H01M 10/0567 |
| 2017/0346087 | A1* | 11/2017 | Watanabe | B22F 9/04 |
| 2018/0019470 | A1* | 1/2018 | Odom | H01M 4/134 |
| 2018/0316054 | A1* | 11/2018 | Matsushita | H01M 10/0587 |
| 2019/0036162 | A1* | 1/2019 | Oh | C08F 299/024 |
| 2020/0377678 | A1* | 12/2020 | Browne | C08K 3/02 |

FOREIGN PATENT DOCUMENTS

| | | | | |
|---|---|---|---|---|
| JP | 11-307084 | A | | 11/1999 |
| JP | 2000-306607 | A | | 11/2000 |
| JP | 2004-014270 | A | | 1/2004 |
| JP | 2004-134175 | A | | 4/2004 |
| JP | 2008-269979 | A | | 11/2008 |
| JP | 2009-064574 | A | | 3/2009 |
| JP | 2011-119183 | A | | 6/2011 |
| JP | 2012-182012 | A | | 9/2012 |
| JP | 2014-026966 | A | | 2/2014 |
| JP | 2014-127370 | A | | 7/2014 |
| JP | 2014127370 | A | * | 7/2014 |
| JP | 2015-002122 | A | | 1/2015 |
| JP | 2015-040157 | A | | 3/2015 |
| WO | WO-2015111189 | A1 | * | 7/2015 ........ H01M 10/0585 |
| WO | 2015/146899 | A1 | | 10/2015 |

OTHER PUBLICATIONS

Office Action dated Sep. 1, 2020 in Japanese Application No. 2019-559875.

\* cited by examiner

Fig. 1
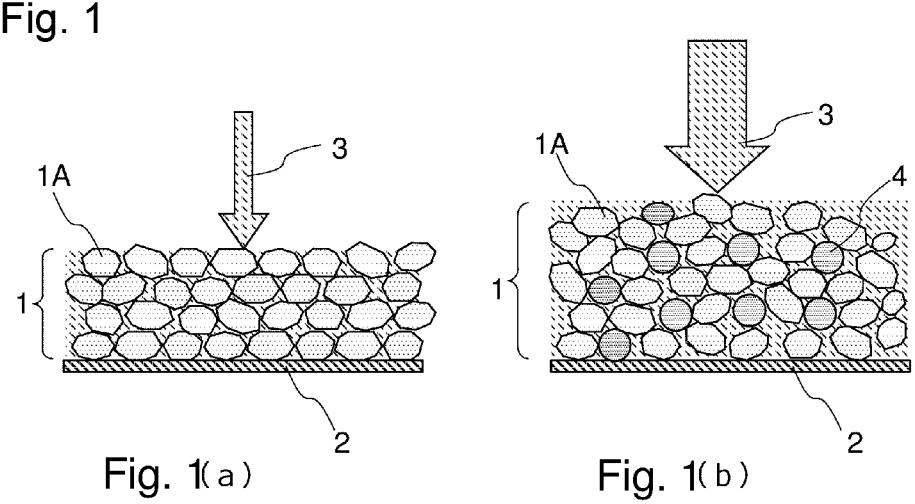
Fig. 1(a)   Fig. 1(b)
Fig. 2
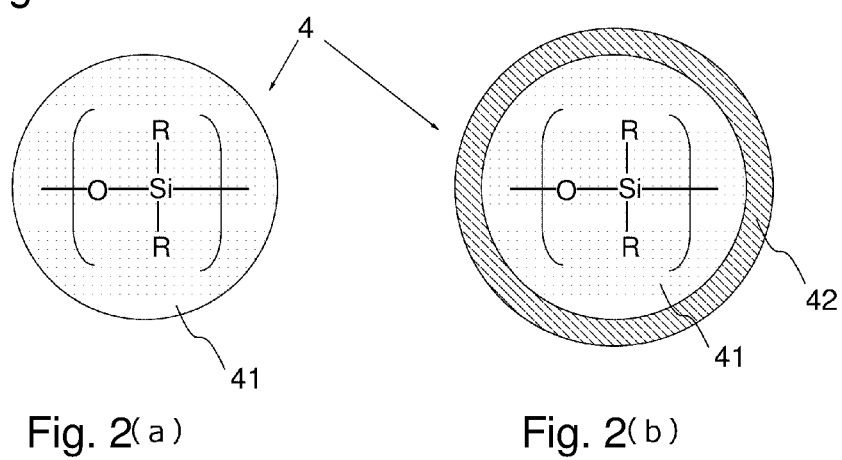
Fig. 2(a)   Fig. 2(b)

SILICONE BALL CONTAINING ELECTRODE AND LITHIUM ION BATTERY INCLUDING THE SAME

CROSS REFERENCE TO RELATED APPLICATIONS

This application is a National Stage of International Application No. PCT/JP2017/002895 filed Jan. 27, 2017.

TECHNICAL FIELD

The present invention provides a new system for fast chargeable lithium ion batteries, with electrode containing silicone balls.

BACKGROUND ART

Lithium-ion (Li-ion) batteries have been widely used for portable electronics, and they are being intensively pursued for hybrid vehicles (HVs), plug-in hybrid vehicles (PHVs), electric vehicles (EVs), and stationary power source applications for smarter energy management systems. The greatest challenges in adopting the technology for large-scale applications are the energy density, power density, cost, safety, and cycle life of current electrode materials. Among all the properties, high energy density and fast chargeable capabilities arc especially important for batteries in automobile application. JP2015-040157A proposes to use a Fe-substituted lithium rich cathode which has higher capacity than a conventional lithium transition metal oxide cathode, and a silicon based anode to build a high energy density lithium ion battery. However, the power performance for such a combination of the lithium rich cathode and the silicon based anode is poor, and the rate performance is not discussed. On the other hands, WO2015/146899 discloses air treated pitch cokes as an anode active material for lithium ion batteries with high charging rate. However, the pitch cokes based soft carbon materials have smaller capacities than graphite and the soft carbon materials are hard to fabricate a lithium ion battery with energy density higher than 160 Wh/kg. There are some other attempts; for example, JP2009-064574A discloses a double layer anode, which has a low rate layer comprising artificial graphite closer to a current collector and a high rate layer comprising natural graphite on the low rate layer. Moreover, JP2015-002122A discloses graphite particles covered with at least one material selected from (1) Si or Si compounds, (2) Sn or Sn compounds, and (3) soft carbons at the edge portion to increase the charging rate. However, the cost for producing the anode material of JP2009-064574A is extremely high and the control of the material quality is difficult. Also, the synthesis of the materials in JP2015-002122A is difficult and costly; the 6C charge property is not descripted in this patent. As a result, the conventional anode materials as well as electrolyte systems are hard to satisfy the requirements for both high energy density and fast chargeable capability.

JP 2012-182012A discloses an electrode for a lithium secondary battery which can achieve both of retainability for a nonaqueous electrolyte and binding properties between graphite particles or between the graphite particles and a collector by using a specific particulate binding material comprising a first rubber-like resin particle having an average particle size of 130-300 nm and a second rubber-like resin particle that has higher swelling properties to the nonaqueous electrolyte than that of the first rubber-like resin particle and an average particle size less than 130 nm.

CITATION LIST

Patent Literature

PTL 1: JP2015-040157A
PTL 2: WO2015/146899
PTL 3: JP2009-064574A
PTL 4: JP2015-002122A
PTL 5: JP 2012-182012A

SUMMARY OF INVENTION

Technical Problem

Currently, there is no lithium ion battery system (anode, cathode, binder, electrolyte and additives, et al) that can have both high energy density (higher than 200 Wh/kg) and fast chargeable capability (6C constant current charge with more than 60% of the retention).

Therefore, an object of the present invention is to provide a new lithium ion battery system that can have both high energy density and fast chargeable capability.

Solution to Problem

That is, the present invention provides the following aspects:

(A)

A lithium ion battery, including:
an anode including an anode active material layer on an anode current collector, the anode active material layer having a mass load higher than 60 g/m$^2$,
a cathode including a cathode active material layer on a cathode current collector, the cathode active material layer having a mass load higher than 80 g/m$^2$, and
an electrolytic solution including an imide anion based lithium salt and LiPO$_2$F$_2$,
wherein at least one of the anode and cathode active material layers includes a spacer comprising a silicone ball.

(B)

The lithium ion battery according to A, wherein the silicone rubber ball is modified the silicone with at least one group selected from the group consisting of hydrocarbons, oxygen-containing groups and nitrogen-containing groups.

(C)

The lithium ion battery according to A-B, wherein the diameter of the spacer is between 1 μm to 40 μm and the diameter ratio of the active material to the spacer is between 0.25 to 10.

(D)

The lithium ion battery according to A-C, wherein the additive weight ratio of the spacer is between 1% to 30% by mass.

(E)

The lithium ion battery according to A-D, wherein the electrolytic solution comprises a composite of the imide anion based lithium salt and a conventional lithium salt other than the imide anion based lithium salt as an electrolyte and the mole ratio of the imide anion based lithium salt to the conventional lithium salt is from 1/1 to 10/1.

(F)

The lithium ion battery according to A-E, wherein the total concentration of the electrolyte in the electrolytic solution is in the range of 0.1 to 3 moles/L.

(G)

The lithium ion battery according to A-E, wherein the cathode collector is made of aluminum.

(H)

The lithium ion battery according to A-G, wherein the electrolytic solution comprises ethylene carbonate (EC), dimethyl carbonate (DMC) and ethyl methyl carbonate (EMC) as solvents, with the volume ratio of ED/DMC/EMC being x:y:100-x-y, where x is 15 to 50% by volume, y is 20 to 60% by volume and x+y is less than 100% by volume.

(I)

The lithium ion battery according to A-H, wherein an amount of $LiPO_2F_2$ is 0.005 to 7% by mass in the electrolytic solution.

(J)

The lithium ion battery according to A-I, wherein the anode material layer comprises a carbon material as an active material and the carbon material is a graphite particle having pores on the surface and having hollow or interconnected pores, or interconnected inside cracks at the core part of the graphite particle.

Advantageous Effects of Invention

According to any one of the aspects of the present invention, a fast chargeable high energy density lithium ion battery can be provided.

BRIEF DESCRIPTION OF DRAWINGS

FIG. 1(a) is a schematic diagram of an electrode without spacer and FIG. 1(b) is a schematic diagram of an electrode with spacer.

FIGS. 2(a) and 2(b) are conceptual figures of the silicone ball.

DESCRIPTION OF EMBODIMENTS

Lithium Ion Battery

Figure 3:
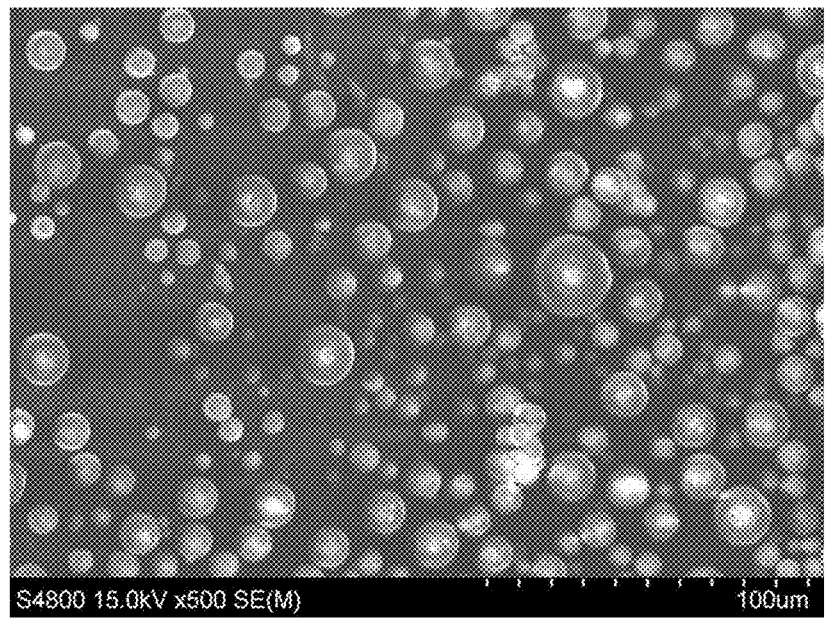
FIG. 3 shows a SEM image of the silicone ball 2 used in Example 2.

A lithium ion battery of one exemplary embodiment of the present invention includes a positive electrode (i.e., cathode) and a negative electrode (i.e., anode), and a specific spacer including a silicone ball added to at least one electrode active material layer, and non-aqueous electrolytic solution. This invention proposes a special combination of the spacer included anode or cathode or both of them and electrolyte with additives to fabricate lithium ion batteries with fast chargeable capabilities.

(Anode)

The anode of the present invention includes a carbon material as an anode active material.

<Carbon Materials>

The carbon material can be selected from natural graphite, artificial graphite, soft carbon, hard carbon, MCMB, or their composition. The shape of the carbon material can be spherical or flake. The spherical graphite particles are preferred since the compatibility of battery industry and ease of process.

The size (diameter or length in the major axis) of the carbon material can be in the range of 1 μm to 30 μm, preferably 5 μm to 20 μm, and more preferably 7 μm to 10 μm. This is because the larger particle size will have a longer in-plane lithium ion diffuse distance when intercalation, that attribute to poor charge rate, in contrast, very small carbon particles, such as less than 1 μm will have a lot of edge plane which will have irreversible reactions with electrolyte at initial charge and discharge, which lead to low initial coulombic efficiency. The specific surface area of the carbon material is preferably controlled in the range of 1 $m^2/g$ to 15 $m^2/g$ so as to have an acceptable initial coulombic efficiency. The carbon material can also have both pores on the surface and hollow or interconnected pores, or interconnected inside cracks at the core part of the graphite material. Regarding to the definition of the core part, it is defined as the inner 70% of the volume of the carbon material.

Such a modified carbon material can be obtained by the following steps:

(S1) Graphite or graphite-carbon composite with less crystallinity, amorphous or defect rich core is prepared as a raw material.

(S2) The raw material is subjected to a first heating in an oxygen-containing atmosphere. The first heating can be carried out in an oven at a temperature of 500 to 800° C. with a temperature rising rate of 15 to 30° C./min. The concentration of oxygen is 5% to 30% by volume. Air can be used as the oxygen-containing atmosphere. The temperature and atmosphere are kept for 1 to 4 hours to activate core part of the raw material from the surface.

(S3) Thus activated carbon material is then subjected to a second heating in an inert atmosphere at a temperature higher than the temperature of the first heating with the slower temperature rising rate than the first heating. For example, the oven is first vacuumed, and then filled with 100% nitrogen and heated up to 900 to 1200° C. with the temperature rising rate of 1 to 10° C./min. The second heating can be carried out for 2 to 6 hours to obtain the modified anode material of the present exemplary embodiment. According to the slower rising rate, the morphology of the activated carbon material in the first heating can be maintained. The modified carbon material has pores on the surface and inner channels in the core part. The time of the second heating can include the temperature rising period.

The carbon materials can be further covered by a thin layer of nano particles of inorganic oxides. Graphite, especially natural spherical graphite has less lipophilicity and therefore the wettability of the carbon material to the electrolytic solution including non-aqueous organic solvents would be wrong. In high rate charging, the electrolyte ions have difficulties to achieve to the surface of the carbon material. The coating of nano particles of oxides, such as MgO or $Al_2O_3$ on the carbon material can have better wettability to the electrolytic solution than the non-coated carbon material; as a result, the rate capability can be increased.

(Cathode)

As for the positive electrode active material, there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The positive electrode active material may also be at least one compound selected from chalcogen compounds, such as titanium disulfate or molybdenum disulfate. More preferred are lithium cobalt oxide (e.g., $Li_xCoO_2$ where $0.8 \le x \le 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube. They can be readily mixed with an additional conductor such as acetylene black, carbon black, and ultra-fine graphite particles.

In this invention, it is preferably to use layered structure lithium-mixed metal oxide such as $LiCo_{0.8}Ni_{0.2}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.8}Co_{0.1}Mn_{0.1}O_2$, $LiNi_{0.8}Co_{0.15}Al_{0.05}O_2$, $Li_{1.2}Mn_{0.4}Ni_{0.4}O_2$, $Li_{1.2}Mn_{0.6}Ni_{0.2}O_2$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.4}Co_{0.2}Mn_{1.25}Ti_{0.15}O_4$, $Li_{1.2}Ni_{0.18}Mn_{0.54}Co_{0.08}O_2$ as cathode materials. Moreover, the layered structure cathode materials can be used alone or in combination of two or more materials. For example, NCM523 can be combined with NCM811 with the ratio of 1:1 as cathode materials. Here, NCMabc such as NCM523 and NCM811 is an abbreviation of lithium-nickel-cobalt-manganese complex oxides where a, b and c are mole ratios of nickel, cobalt and manganese, respectively.

The specific surface area of the cathode material can be controlled in a range of 0.01 to 20 $m^2/g$, preferably 0.05 to 15 $m^2/g$, more preferably 0.1 to 10 $m^2/g$ and most preferably 0.15 to 8 $m^2/g$. The diameter of the cathode material can be in a range of 250 nm to 50 μm, preferably 500 nm to 40 μm.

<Spacer>

In the present invention, silicone balls are used as a spacer. This is because the high energy density designed lithium ion battery needs to have high mass load of both anode and cathode, which attribute to ultra-thick electrode. The mass load of the anode is 60 $g/m^2$ or more and the mass load of the cathode is 80 $g/m^2$ or more to realize the energy density higher than 160 Wh/kg. Generally, the electrode is prepared by coating slurry containing an active material 1A on a current collector 2, drying and then pressing to fix the active material layer 1 on the current collector 2. As shown in FIG. 1(a), the conventional electrodes after pressing will have very limited spaces for maintaining the electrolyte 3. When charging such a kind of battery in high rate, the lithium ions in the electrolyte absorbed in the electrodes will be quickly consumed and lithium ion supply speed from the cathode active material is inefficient for such a thick electrode. As a result, in a short time reached the cut-off potential that causes the over potential, and therefore it can only charge a small energy. As shown in FIG. 1(b), the use of spacer 4 can provide more space to absorb the electrolyte 3 in the active material layer 1, and ensure the space is valid for both anode and cathode.

In addition, the silicone ball has a good oil absorption property. Therefore, the silicone ball can absorb an electrolytic solution. That is, the silicone ball has also a function for supplying the lithium ions so that lithium-ion intercalation to the anode material at the time of charging can be much enhanced.

The silicone ball is typically a spherical or near spherical silicone rubber powder having a structure of crosslinked linear dimethylpolysiloxane. FIG. 2 shows a conceptual figure for silicone ball 4. FIG. 2(a) shows silicone rubber powder 41 wherein both Rs are methyl groups for the typical silicone rubber as silicone ball 4. The silicone rubber can be modified with at least one group as R selected from the group consisting of hydrocarbon groups such as C2-C8 alkyl groups and aryl groups (e.g., phenyl), oxygen-containing functional groups such as hydroxyl and carboxyl, and nitrogen-containing functional groups such as amino and imino groups. Such a silicone rubber powder 41 can be further coated with a functional coating 42 such as a hard silicone resin having a structure of polyorganosilsesquioxane $[(R'SiO_{1.5})_n]$ (R' is a hydrocarbon group such as methyl and phenyl) or conductive polymer to increase mechanical strength or conductivity as shown in FIG. 2(b) to form a silicone ball 4.

The spherical or near spherical silicone ball can be for good performance. However, the shape of the spacer is not limited to spherical; it can also be indefinite shape.

The size (average diameter) of the spacer is preferably in a range of 1 μm to 40 μm. In addition, the diameter ratio of the active material to the spacer is preferably in a range of 0.25 to 10. The silicone ball is commercially available. For example, KMP series and KSP series, which are products of Shin-Etsu Chemical Co., Ltd., and the like are mentioned.

(Binder)

For the preparation of an electrode, binder is needed to be used for both anode and cathode. Examples of the binder include polytetrafluoroethylene (PTFE), polyvinylidene fluoride (PVDF), ethylene propylene diene copolymer (EPDM), or styrene-butadiene rubber (SBR). When using SBR, carboxy methyl cellulose (CMC) is preferably used as a binding auxiliary.

(Electrolytic Solution)

Electrolytic solution includes an electrolyte, an additive and non-aqueous solvent. In particular, the electrolytic solution of the present invention includes imide anion based lithium salt as the one kind of electrolyte salt and lithium difluorophosphate ($LiPO_2F_2$) as the additive.

<Electrolyte>

The electrolyte is used as a composite of an imide anion based lithium salt such as lithium bis(fluorosulfonyl) imide (LiFSI) and a conventional lithium salt, such as lithium hexafluorophosphate ($LiPF_6$), lithium tetrafluoroborate ($LiBF_4$) et al. The composite of LiFSI and $LiPF_6$ is preferably used.

Figure 6:
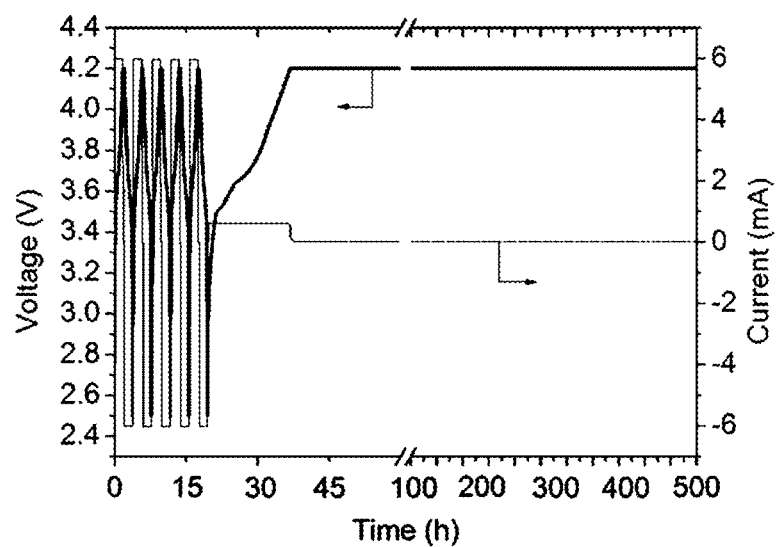
FIG. 6 shows results of 4.2V, 500h floating corrosion test.

The total concentration of the electrolyte can be in the range of 0.1 to 3 moles/L. The range is preferable to 0.5 to 2 moles/L. When the range is 0.1 moles/L or more, sufficient ion conductivity can be obtained. When the range is 3 moles/L or less, it can be avoided to become the viscosity of electrolytic solution too high. The mole ratio of the ionic liquid to the lithium salt can be selected from 1/9 to 9/1. The use of the imide anion based lithium salt can have to a quick desolvation effect when intercalation, which attribute to faster charging rate than conventional electrolyte system. However, the usage of pure ionic liquid such as LiFSI will etch the Al current collector at a full charged state; the use of composite electrolyte can effectively prevent the corrosion of Al current collector. The 4.2 floating experiment is shown in FIG. 6. The floating experiment was carried out by using a test cell of Example 1 below described. The test cell was repeated charging (IC CCCV) and discharging (IC CC) at five times from 2.5V to 4.2V and thereafter charged to 4.2V and kept at floating state at 4.2V for 500h. As shown in FIG. 6, voltage and current are flat so that it can be learned there is no corrosion current even float in 4.2V for 500h.

<Solvent>

A wide range of solvent can be used for lithium ion batteries. Most preferred are non-aqueous and polymer gel electrolytes although other types can be used. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high ion conductivity. A non-aqueous solvent solely composed of ethylene carbonate (EC) is advantageous in that it is relatively stable against decomposition although a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte solvent to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 15 to 50% by volume. The larger content of EC will attribute to higher energy cost of desolvation which affects the charging speed. DMC and EMC are also included in this invention as a ternary solvent system of EC/DMC/EMC for better viscosity and ion conduction. The volume ratio of EC/DMC/EMC is defined as x:y:100-x-y, where x is 15 to 50% by volume, y is 20 to 60% by volume and x+y is less than 100% by volume. The volume ratio y of DMC is more preferably 30 to 50% by volume.

<Additives>

In the invention, lithium difluorophosphate ($LiPO_2F_2$) is added to the solvent for better rate capability. An additive amount of $LiPO_2F_2$ is preferably 0.005 to 7% by mass and more preferably 0.01 to 5% by mass. The decomposition of $LiPO_2F_2$ can form a thin and highly conductive film on cathode materials that favorable to the fast charge and discharge capability.

(Cell)

The positive and negative electrodes can be formed by applying electrode compound slurry on a current collector such as copper foil for the negative electrode and aluminum or nickel foil for the positive electrode. There is no particularly significant restriction on the type of the current collector, provided that the collector can smoothly path current and have relatively high corrosion resistance. The positive and negative electrodes can be stacked with interposing a separator therebetween. The separator can be selected from a synthetic resin nonwoven fabric, porous polyethylene film, porous polypropylene film, or porous PTFE film.

A casing for the battery in the exemplary embodiment may be, for example, a laminate film in which a substrate, a metal foil and a sealant are sequentially laminated. Examples of a substrate which can be used include a resin film with a thickness of 10 to 25 μm made of polyester (PET) or Nylon. A metal foil may be an aluminum film with a thickness of 20 to 40 μm. A sealant may be a rein film with a thickness of 30 to 70 μm made of polyethylene (PE), polypropylene (PP), functionalized polypropylene (fPP) or an ionomer.

EXAMPLES

Comparative Example 1

Cathode:

$LiNi_{0.5}Co_{0.2}Mn_{0.3}O_2$ (abbreviated as NCM523) having an average diameter of 9.6 μm was used as a cathode active material. Cathode slurry was formulated by the weight ratio of the cathode active material:PVDF:carbon black as 89:4:7 and deposited on a 15 μm-thick of Al current collector with the mass load of 200 $g/m^2$. The density of the cathode is controlled at 2.8 $g/cm^3$.

Anode:

Spherical natural graphite with specific surface area of 5 $m^2/g$ and an average diameter of 12 μm was used as anode active material. Anode slurry was formulated by a weight ratio of active materials:CMC:SBR:carbon black as 92:2:2:4 and deposited on a 20 μm-thick Cu foil with the mass load of 88 $g/m^2$. The density of the anode is controlled at 1.4 $g/cm^3$.

Cell:

Thus obtained cathode and anode were laminated interposing porous polypropylene separator. The resultant laminate and an electrolytic solution prepared as follows were sealed into an aluminum laminate container to fabricate a test cell. The energy density of the cell was designed to 200 Wh/kg.

Electrolytic Solution:

0.65 mole/L of LiFSI and 0.65 mole/L of $LiPF_6$ as an electrolyte and 1% by weight of $LiPO_2F_2$ were dissolved in a mixed solvent of EC/DMC/EMC=2/4/4 to prepare an electrolytic solution.

Example 1

Example 1 was performed in the same manner as in Comparative Example 1 except for adding 5% by mass of silicone ball (trade name: "KMP601", manufactured by Shin-Etsu Chemical Co. Ltd., abbreviated as "ball spacer 1") with the average diameter of 12 μm to the anode slurry. The diameter ratio of active material to ball spacer 1 is 1.

Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.

Example 2

Figure 4:
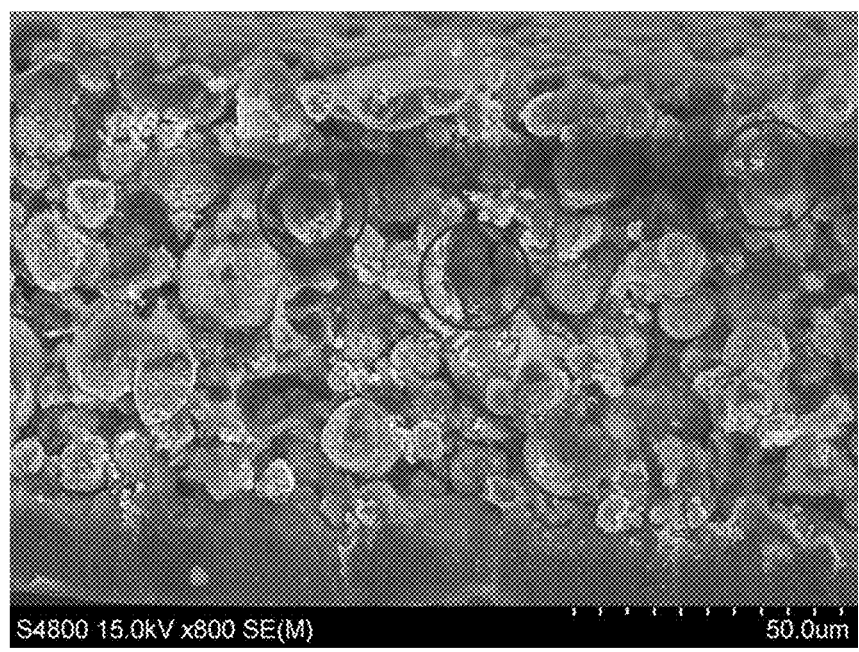
FIG. 4 shows a SEM image of the cross section of the anode in Example 2.

Example 2 was performed in the same manner as in Comparative Example 1 except for adding 5% by mass of alkyl-functionalized silicone ball (trade name: "KSP-411", manufactured by Shin-Etsu Chemical Co. Ltd., abbreviated as "ball spacer 2") with the average diameter of 12 μm to the anode slurry. The diameter ratio of active material to ball spacer 2 is 1. The SEM image of ball spacer 2 is shown in FIG. 3. The cross-section image of ball spacer 2 included anode is shown is FIG. 4. In FIG. 4, ball spacers 2 are encircled.
Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.

Example 3

Example 3 was performed in the same manner as in Comparative Example 1 except for adding 5% by mass of phenyl-functionalized silicone ball (trade name: "KSP-300", manufactured by Shin-Etsu Chemical Co. Ltd., abbreviated as "ball spacer 3") with the average diameter of 6 μm to the anode slurry. The diameter ratio of active material to ball spacer 3 is 1.
Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.

Example 4

Example 4 was performed in the same manner as in Comparative Example 1 except for adding 5% by mass of alkyl-functionalized silicone ball (trade name: "KSP-441", manufactured by Shin-Etsu Chemical Co. Ltd., abbreviated as "ball spacer 4") with the average diameter of 6 μm to the anode slurry. The diameter ratio of active material to ball spacer 4 is 2.
Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.

Example 5

Example 5 was performed in the same manner as in Comparative Example 1 except for adding 5% by mass of ball spacer 1 used in Example 1 to the cathode slurry. The diameter ratio of active material to ball spacer 1 is 1.25.
Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.

Example 6

Figure 5:
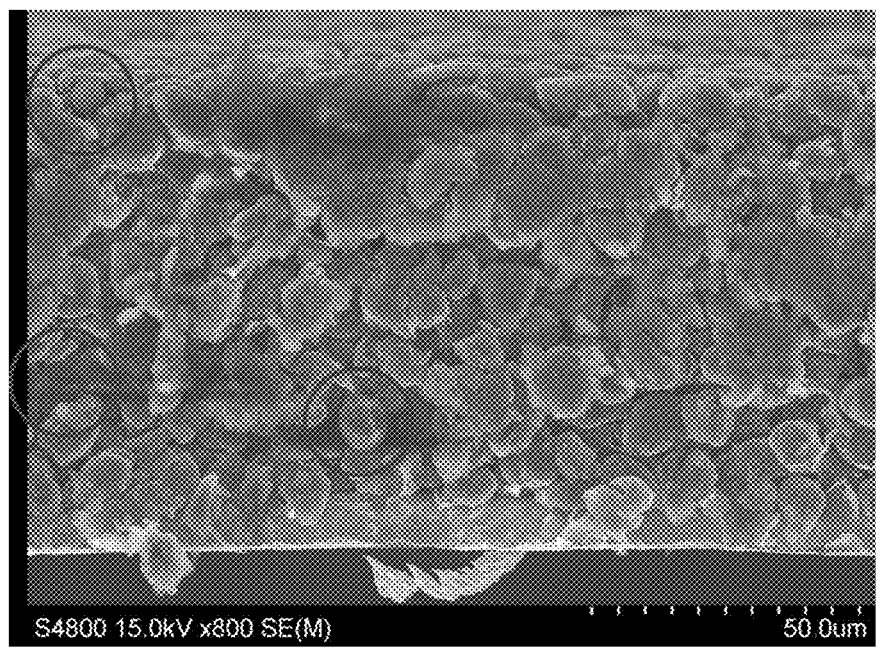
FIG. 5 shows a SEM image of the cross section of the cathode in Example 6.

Example 6 was performed in the same manner as in Comparative Example 1 except for adding 5% by mass of ball spacer 2 used in Example 2 to the cathode slurry. The diameter ratio of active material to ball spacer 2 is 1.25. The cross-section image of ball spacer 2 included cathode is shown is FIG. 5. In FIG. 5, ball spacers 2 are encircled.
Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.

Example 7

Example 7 was performed in the same manner as in Comparative Example 1 except for adding 5% by mass of ball spacer 2 used in Example 2 to both anode and cathode slurry. The diameter ratios of anode and cathode active materials to ball spacer 2 are 1 and 1.25, respectively.
Electrolytic Solution:

0.65 mole/L of LiFSI and 0.65 mole/L of LiPF$_6$ as an electrolyte and 1% by weight of LiPO$_2$F$_2$ were dissolved in a mixed solvent of EC/DMC/EMC=2/4/4 to prepare an electrolytic solution.
Electrochemical Characterization The rate capability was characterized for each cell. Specifically, the cells were charged from 2.5V to 4.2V in 0.1C, 0.2C, 0.5C, 1C, 2C, 3C, 4C, 6C, 8C, 10C in constant current (CC) mode and discharged from 4.2V to 2.5V in 0.1C in CC mode. The capacity ratio 6C/0.1C and 10C/0.1C are used to evaluate the rate performance of the cells.
[Table 1]

TABLE 1

| | Electrodes | | Diameter | Electrolytic solution | | | Rate characteristics (%) | |
| --- | --- | --- | --- | --- | --- | --- | --- | --- |
| | Anode | Cathode | ratio | Electrolyte | Additives | Solvent | 6 C/0.1 C | 10 C/0.1 C |
| Comperative example 1 | Graphite | NCM523 | / | 0.65M LiPF$_6$ 0.65M LiFSI | 1 wt % LiPO$_2$F$_2$ | EC/DMC/EMC (2/4/4) | 55 | 15 |
| Example 1 | Graphite + ball spacer 1 | NCM523 | 1 | 0.65M LiPF$_6$ 0.65M LiFSI | 1 wt % LiPO$_2$F$_2$ | EC/DMC/EMC (2/4/4) | 60 | 19 |
| Example 2 | Graphite + ball spacer 2 | NCM523 | 1 | 0.65M LiPF$_6$ 0.65M LiFSI | 1 wt % LiPO$_2$F$_2$ | EC/DMC/EMC (2/4/4) | 64 | 23 |
| Example 3 | Graphite + ball spacer 3 | NCM523 | 1 | 0.65M LiPF$_6$ 0.65M LiFSI | 1 wt % LiPO$_2$F$_2$ | EC/DMC/EMC (2/4/4) | 60 | 19 |
| Example 4 | Graphite + ball spacer 4 | NCM523 | 2 | 0.65M LiPF$_6$ 0.65M LiFSI | 1 wt % LiPO$_2$F$_2$ | EC/DMC/EMC (2/4/4) | 67 | 32 |
| Example 5 | Graphite | NCM523 + ball spacer 1 | 1.25 | 0.65M LiPF$_6$ 0.65M LiFSI | 1 wt % LiPO$_2$F$_2$ | EC/DMC/EMC (2/4/4) | 63 | 23 |
| Example 6 | Graphite | NCM523 + ball spacer 2 | 1.25 | 0.65M LiPF$_6$ 0.65M LiFSI | 1 wt % LiPO$_2$F$_2$ | EC/DMC/EMC (2/4/4) | 67 | 24 |

TABLE 1-continued

| | Electrodes | | Diameter | Electrolytic solution | | | Rate characteristics (%) | |
|---|---|---|---|---|---|---|---|---|
| | Anode | Cathode | ratio | Electrolyte | Additives | Solvent | 6 C/0.1 C | 10 C/0.1 C |
| Example 7 | Graphite + ball spacer 2 | NCM523 + ball spacer 2 | 1 and 1.25 | 0.65M LiPF$_6$ 0.65M LiFSI | 1 wt % LiPO$_2$F$_2$ | EC/DMC/EMC (2/4/4) | 70 | 35 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1: Active material layer
1A: Active material
2: Current collector
3: Electrolyte
4: Ball Spacer
    41: Silicone rubber powder
    42: Functional coating

The invention claimed is:

1. A lithium ion battery, comprising:
an anode comprising an anode active material layer on an anode current collector, the anode active material layer having a mass load higher than 60g/m$^2$,
a cathode comprising a cathode active material layer on a cathode current collector, the cathode active material layer having a mass load higher than 80g/m$^2$, and
an electrolytic solution comprising an imide anion based lithium salt and LiPO$_2$F$_2$,
wherein the anode active material layer comprises a ball spacer comprising silicone ball having a diameter of 12 μm to 40 μm, and an anode active material consisting essentially of a carbon material.

2. The lithium ion battery according to claim 1, wherein the silicone ball comprises silicone modified with at least one functional group selected from the group consisting of hydrocarbons, oxygen-containing groups and nitrogen-containing groups.

3. The lithium ion battery according to claim 1, wherein a diameter ratio of the active material to the spacer is between 0.25 to 10.

4. The lithium ion battery according to claim 1, wherein the electrolytic solution comprises a composite of the imide anion based lithium salt and a conventional lithium salt other than the imide anion based lithium salt as an electrolyte and the mole ratio of the imide anion based lithium salt to the conventional lithium salt is from 1/1 to 10/1.

5. The lithium ion battery according to claim 1, wherein the total concentration of the electrolyte in the electrolytic solution is in the range of 0.1 to 3 moles/L.

6. The lithium ion battery according to claim 1, wherein the cathode collector is made of aluminum.

7. The lithium ion battery according to claim 1, wherein the electrolytic solution comprises ethylene carbonate (EC), dimethyl carbonate (DMC) and ethyl methyl carbonate (EMC) as solvents, with the volume ratio of EC/DMC/EMC being x:y:100-x-y, where x is 15 to 50% by volume, y is 20 to 60% by volume and x+y is less than 100% by volume.

8. The lithium ion battery according to claim 1, wherein an amount of LiPO$_2$F$_2$ is 0.005 to 7% by mass in the electrolytic solution.

9. The lithium ion battery according to claim 1, wherein the carbon material is a graphite particle having pores on the surface and having hollow or interconnected pores, or interconnected inside cracks at the core part of the graphite particle.

10. The lithium ion battery according to claim 1, wherein a weight ratio of the silicone ball in the anode active material layer is between 1% to 30% by mass when a total mass of the anode active material layer is considered to be 100% by mass.

11. A lithium ion battery, comprising:
an anode comprising an anode active material layer on an anode current collector, the anode active material layer having a mass load higher than 60g/m$^2$,
a cathode comprising a cathode active material layer on a cathode current collector, the cathode active material layer having a mass load higher than 80g/m$^2$, and
an electrolytic solution comprising an imide anion based lithium salt and LiPO$_2$F$_2$,
wherein either the cathode active material layer comprises a ball spacer comprising a silicone ball or both of the anode active material layer and the cathode active material layer comprise a ball spacer comprising a silicone ball.

12. The lithium ion battery according to claim 11, wherein the silicone ball comprises silicone modified with at least one functional group selected from the group consisting of hydrocarbons, oxygen-containing groups and nitrogen-containing groups.

13. The lithium ion battery according to claim 11, wherein a diameter ratio of the active material to the spacer is between 0.25 to 10.

14. The lithium ion battery according to claim 11, wherein a weight ratio of the silicone ball in the cathode active material layer is between 1% to 30% by mass when a total mass of the cathode active material layer is considered to be 100% by mass.

15. The lithium ion battery according to claim 11, wherein the electrolytic solution comprises a composite of the imide anion based lithium salt and a conventional lithium salt other than the imide anion based lithium salt as an electrolyte and the mole ratio of the imide anion based lithium salt to the conventional lithium salt is from 1/1 to 10/1.

16. The lithium ion battery according to claim 11, wherein the total concentration of the electrolyte in the electrolytic solution is in the range of 0.1 to 3 moles/L.

17. The lithium ion battery according to claim 11, wherein the cathode collector is made of aluminum.

18. The lithium ion battery according to claim 11, wherein the electrolytic solution comprises ethylene carbonate (EC), dimethyl carbonate (DMC) and ethyl methyl carbonate (EMC) as solvents, with a volume ratio of EC/DMC/EMC being x:y:100-x-y, where x is 15 to 50% by volume, y is 20 to 60% by volume, and x+y is less than 100% by volume.

19. The lithium ion battery according to claim 11, wherein an amount of $LiPO_2F_2$ is 0.005 to 7% by mass in the electrolytic solution.

20. The lithium ion battery according to claim 11, wherein the anode material layer comprises a carbon material as an active material and the carbon material is a graphite particle having pores on the surface and having hollow or interconnected pores, or interconnected inside cracks at the core part of the graphite particle.

* * * * *